United States Patent [19]

Hagen

[11] 4,392,349
[45] Jul. 12, 1983

[54] SPACED APART WAVE GENERATOR FLOAT ARRAY

[76] Inventor: Glenn E. Hagen, 13342 Dwyer Blvd., New Orleans, La. 70129

[21] Appl. No.: 169,509

[22] Filed: Jul. 21, 1980

[51] Int. Cl.$^3$ ............................................. F03B 13/12
[52] U.S. Cl. ...................................... 60/500; 60/501; 60/505
[58] Field of Search .................................. 60/497–507; 417/330–332; 290/53, 54

[56] References Cited

U.S. PATENT DOCUMENTS

4,048,801  9/1977  Tornabene ........................ 60/505 X
4,073,142  2/1978  Tornabene ........................ 60/505 X

Primary Examiner—Allen M. Ostrager
Attorney, Agent, or Firm—Arthur M. Dula

[57] ABSTRACT

Apparatus for extracting energy from fluid motion, i.e. waves, comprising spacing a plurality of floating modules, which may be single floats or arrays, on the fluid's surface far enough apart to minimize apparatus cost and close enough together to utilize the vortex-like action of the waves to extract a maximum amount of wave energy. This spacing is preferably about half the wavelength of the incident waves. The energy extracted by the modules is converted to hydraulic, electrical, mechanical, or chemical energy.

2 Claims, 9 Drawing Figures

POWER vs WIND SPEED

Tuned For $\omega = 0.6$  T = 10.5 sec.
Tuned To $\omega = 1.4$  T = 4.5 sec.

FIG. 5

POWER vs WIND SPEED
Tuned For $\omega = 1.0$  $T = 6.28$ sec.
Tuned To $\omega = 1.6$  $T = 4.0$

SPACED APART WAVE GENERATOR FLOAT ARRAY

TECHNICAL FIELD

The present invention relates generally to wave generator float arrays. More specifically, it relates to such arrays wherein space is left between groups of movable floats to utilize the vortex-like action of waves to maximize the float array's cost-efficiency.

BACKGROUND ART

In February 1976 applicant filed U.S. patent application entitled "WAVE DRIVEN GENERATOR," which issued Mar. 7, 1978 as U.S. Pat. No. 4,077,213. The prior art of wave driven generators to 1976 is discussed in detail in U.S. Pat. No. 4,077,213. Subsequent to issuance, applicant filed for reissue on Apr. 23, 1979 and was assigned Ser. No. 032,162. As of the date of the filing of this application, the reissue application is pending. Reissue application Ser. No. 032,162 is incorporated by reference herein.

The present invention is an improvement of the "Hagen Array" taught by U.S. Pat. No. 4,077,213. It was discovered by accident during wave tank tests conducted as part of an experimental test and evaluation program carried out to begin commercial development of the Hagen Array. While the present invention is applicable to applicant's earlier invention, it may also be used in conjunction with any fluid actuated energy extraction apparatus.

A brief description of the present state of the art in fluid energy extraction is in order.

Energy Available

1. Issacs, et al., "Utilization of the Energy for Motion Waves" (Scripps Institute of Oceanography paper presented at the ERDA/University of Delaware Conference on Wave and Salinity Gradient Energy Conversion, May 24–26, 1976) makes the point that over the short and long term waves and wave power are more persistent that wind and wind power. The energy and power in ocean and wind waves can be considerable. Issacs states that a typical average sea state has approximately 1.5 meter waves at 8 second periods. These waves correspond to a mean flux of wave power across a section of the ocean on the order of 10 kilowatts per meter.

2. At the same conference, Dr. Paniker of Woods Hole Oceanographic Institute in Massachusetts presented a paper entitled "Power Resource Potential of Ocean Surface Wave." Dr. Paniker estimated that the total surface wave energy in the seas corresponded to a wave power of $8.9 \times 10^{15}$ watts. The rate of renewal of wave power was estimated at between $10^{12}$ and $10^{13}$ watts, which is about the present level of world power consumption.

3. In his paper, "Alternative Energy at the Crest of the Wave," John Moss, *Electrical Review*, Apr. 30, 1976, Volume 198, No. 17, page 20, concluded that the average annual electric power density of waves in the North Atlantic is nearly 80 kilowatts per meter of frontage.

Specific Examples

As conventional energy prices increase, nations dependent on energy naturally turn to the development of alternative, renewable energy sources. Ocean waves are one such source.

1. The Japan Maritime Science & Technology Center in Yokosuka, Japan has installed a prototype system 80 meters in length, 12 meters in width, and 5 meters in height, which weighs 500 tons. The structure consists of bouyancy rooms and air rooms. The bottom of the air rooms are open to the sea. As waves pass through an air room, air is pushed out of the room. Electric power is generated with an air turbine by the air motion in and out of the air room. The trial generator produces about 2,000 kilowatts of power from three meter waves with six second periods. This device is known as a "Kaimei Ship." See: Masuta, et al., "Possibilities of Large Electric Output by Floating Type Sea Wave Electric Generator," International Ocean Development Conference, Japan, Aug. 5–8, 1975; Miyazaki, et al., "Development of Wave Power Generators," paper from the 1978 Ocean International Conference, Brighton, England, Mar. 5–10, 1978, page 259–271.

2. The "Salter Duck" developed by S. H. Salter at the University of Edinburgh is another device that extracts wave energy efficiently. In his article "Wave Power," Salter reviews about 100 proposals for extracting wave energy. This article is located in the June 21, 1974 issue of *Nature*, volume 249, No. 5459, page 720. A more detailed look at this "nodding duck" technology may be found in the paper "Wave Power—Nodding Duck Wave Energy Extractors" by Salter, et al. presented at the North Carolina State University Conference on Energy from the Oceans, Raleigh, N.C., Jan. 27–28, 1976.

3. Some of these devices have become the subject of U.S. patents. For example: the Salter "nodding duck" is the subject of U.S. Pat. No. 3,928,967. The Cockrell wave raft is the subject of U.S. Pat. No. 4,098,084. The Lockheed Dam-Atoll is the subject of U.S. Pat. No. 4,152,895. Other sea energy wave action devices include U.S. Pat. No. 4,118,932 and 4,048,801.

Hagen Array Test and Development Program

Over the past several years the applicant has been developing the Hagen Array taught by U.S. Pat. No. 4,077,213 to extract useful power from ocean waves. The Hagen Array is an ordered array of floating structures operating over a broad band of incident wave frequencies by selectively tuning the elements of the array to operate over a portion of the incident wave frequency spectrum. It is a "black body" equivalent for fluid surface waves.

As part of applicant's development program, a series of tests were conducted at the Davidson Laboratory of the Stevens Institute of Technology in Hoboken, N.J. in June of 1978. In these tests a scale model prototype of a Hagen Array Wave Driven Generator designed according to the claims of U.S. Pat. No. 4,077,213 was fabricated and tested. A complete copy of the test report is filed with this application as an aid to the Examiner and to become part of the public record when the patent issues.

During applicant's wave tank tests evidence was developed that the Hagen Array undergoing test was absorbing more energy than was present in the wave striking the test array across its beam. Such a result seemed impossible to the Stevens Institute personnel conducting the tests. Their surprise can best be appreciated by reading the remarks of J. F. Dalzell and W. E.

Klosknski of the Stevens Institute, from page 19 of their final test report:

"The present experiments involve a three-dimensional body in a three-dimensional wave field. It is not physically or theoretically plausible to distort waves in a limited patch of surface and then expect that waves outside the pitch of surface are not also distorted in some way. In the preliminary estimates of array efficiency made during the experiments, exactly this was being done because the assumption was made that all the power available to the array was confined to the three-foot strip of instant waves immediately forward of the array. 'Efficiencies' computed in this wave were sometimes in excess of 100% (which is to imply that more power was extracted than was available) and this result occasioned a great deal of double checking of arithmetic and formula.

"Some theoretical results in references 5 and 6 imply that there is no definition of efficiency in the customary sense for the three-dimensional case. In fact one of the theoretical results from these references is that an 'optimally tuned' axisymmetric body of any diameter in a three-dimensional wave field can absorb 100% of the instant power in a wave frontage L where L *may* be *greater* than the diameter of the body, and in fact might be of the order of (wavelength)/2 regardless of body diameter.

"It was concluded that the possibility must be accepted that the present system could be 'gathering in' power from a length of wave frontage greater than its beam." (emphasis in the original) Stevens Test, page 19.

In the past, one problem with wave generators has been the extremely high capital cost of building and mooring the structures that act as float arrays to intercept and absorb wave motion. It would clearly be advantageous to space these arrays apart if, as is suggested by applicant's discovery, such a spacing apart of the float arrays would not diminish the efficiency of the power gathering system. As a result of discoveries made accidentally by applicant during the tests of his earlier invention, applicant believes that he has discovered a way to absorb essentially 100% of the wave energy incident on array elements of a wave generator float array even though the array elements are spaced relatively far apart from each other. The present invention takes advantage of the fact that each element or group of elements may effectively intercept a broader frontage of waves than the mere space it occupies on the fluid surface.

It must be stated that applicant is not certain why this result is obtained. Fortunately it is sufficient under the patent laws of the United States that the applicant be able to tell a person of reasonable skill in the art how to make and use his invention. Applicant need not understand the theory that makes the invention possible.

It is, therefore, an object of the present invention to provide a float array wherein the movable elements or clusters of elements are spaced apart from one another far enough to minimize array construction and anchoring costs while maximizing the amount of energy absorbed by the spaced apart arrays from the incident waves in a fluid.

Another object of the present invention is to provide a spaced apart array that has energy extraction efficiencies arranging from 80% to well above 90% for wave lengths up to about 85% of the overall length of the array.

Still another purpose of the present invention is to provide a spaced apart float array wherein the individual float elements or groups of elements ate spaced apart by a distance equal to about half the wavelength of the incident waves.

Yet another purpose of the present invention is to provide a tuned axi-symmetric wave generator float assembly spaced apart from other like float assemblies such that it can absorb essentially 100% of the instant power from a three-dimensional wave field wherein the axi-symmetric float presents a beam less than the width of the incident wave frontage from which 100% of the incident power is being absorbed.

A final purpose of the present invention is to provide a float array spaced apart such that it gathers in power from the entire length of wave frontage intercepted by the array even though individual elements of the array are spaced apart such that they are separated by approximately half the wavelength of the incident waves falling on the array.

DISCLOSURE OF THE INVENTION

The present invention is a wave generator float array comprising a plurality of floats or plurality of clustered groups of floats, said floats or clusters being spaced apart from one another by a distance approximately equal to half the wavelength of the incident waves falling on the array.

BRIEF DESCRIPTION OF THE DRAWINGS

FIG. 1-A is a profile view and FIG. 1-B is a plan view of a one megawatt wave generator module constructed according to the preferred embodiment of the present invention;

BEST MODE FOR CARRYING OUT THE INVENTION

Theory

Wave Energy (1) Wave Models

The energy of water waves can be calculated if a simple wave form is assumed. For a wave closely approximating a sinusoidal form the energy content is:

$$E = \frac{1}{2} p\, ga^2 \left[ 1 + \frac{2K_o h}{\sinh 2K_o h} \right] \quad [1]$$

where p is the density of sea water, g is the acceleration of gravity, h is water depth, and a is the wave amplitude. The power is given by:

$$P = Ev \quad [2]$$

where v is the group velocity of the wave, $$v = w/2K \quad [3]$$

and where:
  $K_o$ = wave number = $2\pi/\lambda$
  $\lambda$ = wave length
  w = circular frequency
The power therefore is:

$$P = p\frac{1}{2} ga^2 \frac{w}{2K_o} \left[ 1 + \frac{2K_o h}{\sinh 2K_o h} \right] \quad [4]$$

per unit length of wave front.

Wind generated waves even under steady wind conditions are normally made up of a collection or ensemble of waves with varying wave lengths and crest lengths. The individual waves in an ensemble also contain a relatively wide band of frequencies. Wave prediction models generally represent the wave form by means of a power spectral density function from which the energy and power content of waves can be calculated. The use of such a model is based on the assumption that ocean waves are represented as a stationary random process.

Considerable effort has been expended in attempts to formulate prediction models of real wave characteristics. As a matter of practical importance for the purpose of designing wave energy power generation devices precise models are not required. Variation in ocean conditions are extremely large not only month to month but day to day. Pronounced latitude and longitude variations are also observed.

Ultimately, design data for large structures used to produce power for commercial and industrial use will be derived from large scale tests. At the present state of development insufficient test data is available for detailed design. Therefore, for purposes of economic projections and for the design of further tests, existing models of ocean waves and the interactions of waves with power absorbing structures must be used.

For the purposes of site selection and predicting the amount of energy available in ocean waves, existing data on sea state averages is considered adequate.

For the purposes of designing maximum efficiency (that is lowest cost) wave power generators, a detailed and realistic model of power spectra is needed. Data from past observations indicate that using a model such as the Pierson-Moskowitz power spectral density is sufficiently accurate to match real conditions. The uncertainties in predicting the performance of any structure in real sea conditions certainly exceed the errors in using a spectral model such as Pierson-Moskowitz.

Figure 8:
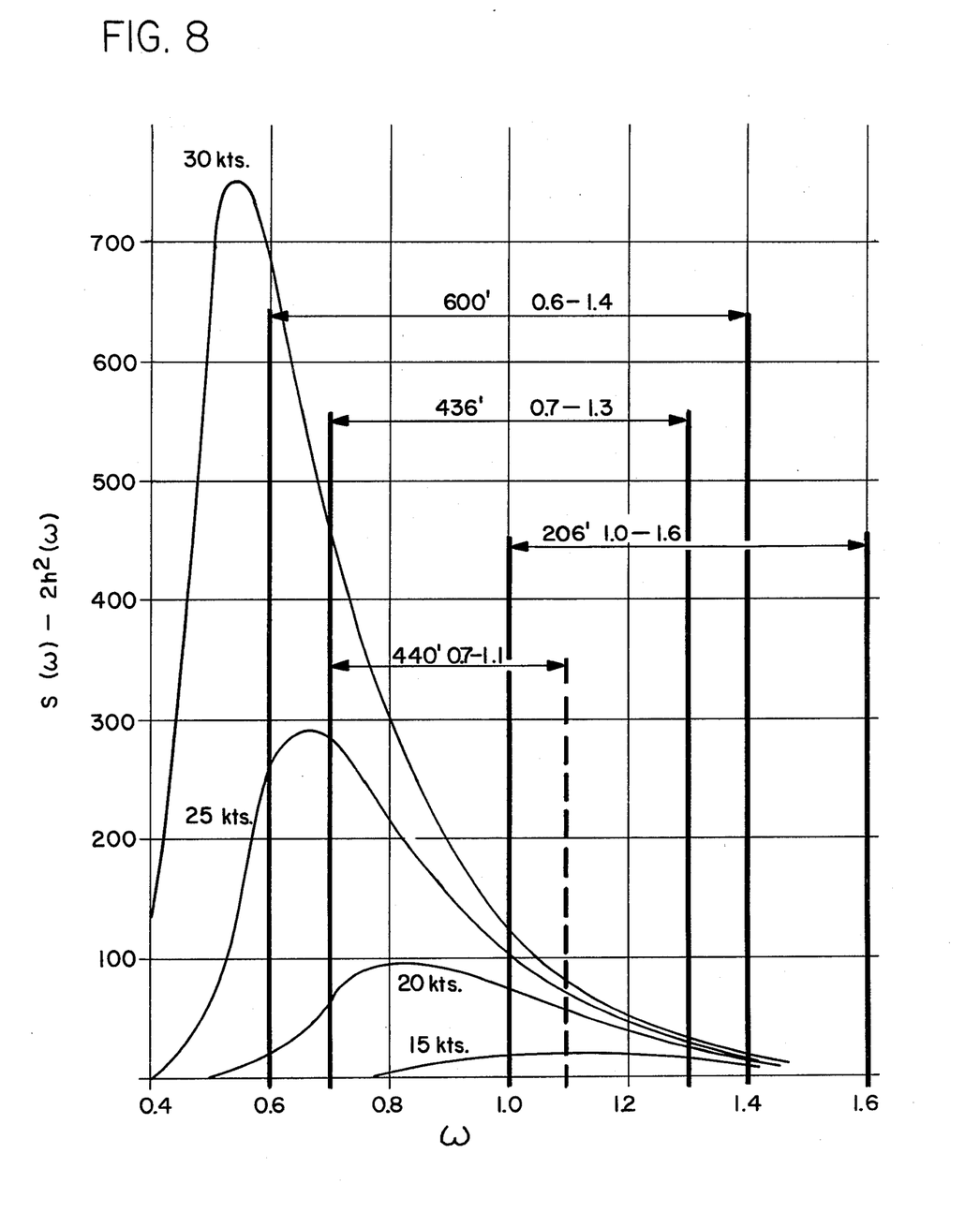
FIG. 8 is a graphical representation of the Pierson-Moskowitz Wave Energy Spectrum for varying wave frequencies and wind velocities.

Pierson-Moskowitz spectra for varying wave frequencies and wind velocities are shown in FIG. 8. The formula for a Pierson-Moskowitz energy spectrum, in English units based on wind velocity is:

$$S(w) = \frac{135}{w^5} e^{-\frac{9.7 \times 10^4}{V_k^4 w^4}} \quad [5]$$

where:
  $S(w) = 2h^2(w)$ = spectral density (ft$^2$-sec)
  w = circular frequency = $2\pi/T$
  $V_k$ = wind velocity (knots)
  h = wave height, crest to trough (ft)

Modified Pierson-Moskowitz spectra formulas having significant wave height and wave period as variables may be used in lieu of the wind variable formula. The energy is given by:

$$E = \frac{1}{2} pg \int_0^\infty S(w)\, dw \quad [6]$$

When h is in feet or meters and T in seconds, E is the wave energy per unit area of sea surface.

The power is then:

$$P = Ev \quad [7]$$
$$= \frac{1}{2} \frac{w}{K_o}$$

Power/unit length of wave front

The prediction model should also account for the effect of the various directional components of waves upon the energy spectrum, i.e. a two-dimensional spectrum should be considered in lieu of the point spectrum previously discussed. A two-dimensional spectrum is more difficult to obtain, however, it may be approximated by $$S(\omega,\mu) = S(\omega) \cdot f(\mu)$$

Where $f(\mu)$ is the "spreading function" and is sometimes assumed to vary as $$f(\mu) = \frac{2}{\pi} \cos^2 \mu$$

Prediction models have also been published using other powers of the cosine function.

Wave Energy Power Available

Considering the sea state observations, it can be concluded that a device designed to extract power from waves at a level such that a 75% wave power utilization factor can be realized would be designed for optimum efficiency in waves of significant wave height of 3 to 5 feet and period of 6.5 seconds. The power available at this design point is 10 Kw/m (16 Mw/statute mile). At a 50% load factor the power available is 40 Kw/m (65 Mw/mile).

The design operating point clearly depends upon the relative cost of the units having different capacity and also on the ability to store energy. If power at 50% load factor can be smoothed by an energy storage system, continuous power at approximately 20 Kw/m is available if the conversion efficiency of the storage system is high.

If a wave energy absorbing device is designed to absorb energy at high wave heights it will operate at design conditions for only a small percentage of time, although it will function as a very effective breakwater. Conversely, a wave energy device which is more reasonably sized to operate at design efficiency for a larger percentage of time, i.e. at smaller wave heights, will not function as effectively as a breakwater. Clearly there are trade-offs to be made among maximum energy absorbed, power utilization factor, breakwater effectiveness and cost.

Wave Absorption

A large variety of devices have been proposed to absorb energy from wave motion and convert it to a useful form. With the exception of a ramp-type device, which converts wave motion into a hydraulic head, most of the devices appear to be float-type devices, which depend upon the heaving motion of the float in response to the incident wave.

Two devices have been designed using fundamental principles of wave energy interaction with objects to optimize power absorption. These are the Salter Duck (U.S. Pat. No. 3,928,967) and the Cockrell raft (U.S. Pat. No. 4,098,084). The energy absorbed depends upon the coupling of wave motion to the device. The motion of the device in response to a wave will clearly depend upon the resistance offered to motion by the power conversion equipment. If the device is allowed to swing freely, little or no energy is transferred to the device; most energy is being transmitted. If the device is mounted rigidly and prevented from responding to the incident wave, energy will be reflected with little or no absorption.

All of the devices described in prior art including the Salter and Cockrell devices are inherently tuned to a small part of the wave frequency spectrum. Because of the resistance offered to motion by the power conversion equipment, the band width of the device may be broadened within certain limits, but the devices must still be classed as narrow band.

The device used to illustrate the preferred embodiment of the present invention is based on the concept of a broad band "Hagen Array" absorber from applicant's U.S. Pat. No. 4,077,213, model tests have indicated that the unit is capable of absorbing a greater amount of energy than is present in a width of incident wave front equal to the model width.

A Hagen Array consists of an array of structures aligned parallel to the direction of propagation of the incident waves. Each element of the array is designed to respond to a different portion of the power spectrum of the incident waves. The first elements of the array are the smallest, as shown in FIG. 1 and are tuned to respond to the highest frequency part of the spectrum. Each succeeding element of the array is tuned over a lower frequency part of the spectrum. A wave incident on the array with a spectral content represented by a Pierson-Moskowitz spectrum, for example, would interact with each element of the array in turn, with each interaction resulting in successively lower frequencies of wave energy being reflected, transmitted and absorbed.

Test Data

Model tests of the applicant's patented device demonstrating the present invention have been completed on two different scales. A tank model approximately 120 inches long and 36 inches wide has been tested under controlled conditions at the Stevens Institute of Technology, Davidson Laboratory. Another model approximately 26 feet long and 8 feet wide has been tested on Lake Pontchartrain in New Orleans, La.

(1) Stevens Institute Tests

The laboratory model was tested under controlled conditions as described in the test report. A copy of this report is filed in the file wrapper of this application. Incident waves were, for the most part, regular waves. Equation 4 was used to calculate the power incident upon the array. The test results indicate that more energy is absorbed by the array than was present in the incident wave front equal to the model width.

No standard definition of efficiency has been developed for wave energy absorption devices. The definition used here is an "absorption length" concept, which is the ratio of the energy absorbed by the total array to the total wave energy incident upon the array in a crest length equal to the beam of the array.

The Stevens Institute test data indicates that a broad band device can absorb more energy from regular waves than is incident upon the device in a wave crest equal to the device's beam. There is supporting evidence from literature that the amount of energy that can be absorbed by a body that is optimally tuned is the energy in a crest length $$L = \lambda/2\pi$$

for an absorber of arbitrary dimensions. There is also analogous data from electromagnetic scattering experiments to the effect that scattering cross sections can exceed the physical dimensions of a scattering object. The results of this test are shown in FIG. 7.

The natural next step was to determine the response of the device to "real" or irregular waves. The model test results can be interpreted to show that the model performance is not greatly different in the two cases in the sense that the energy absorption efficiency is high.

Figure 7:
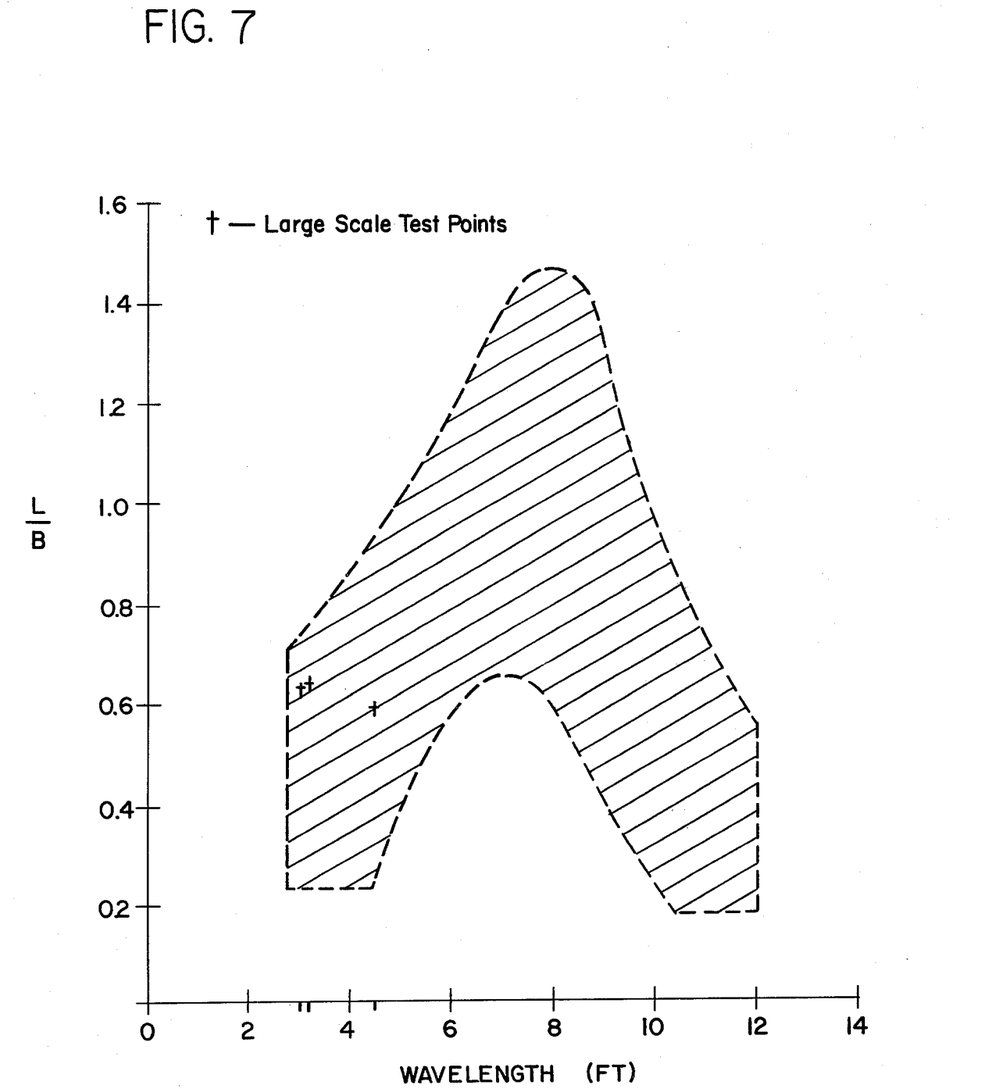
FIG. 7 shows a band of power absorption efficiency at each wavelength. It is a plot of absorption length divided by beam width against the wave length in feet of the instant waves for all non-zero clutch loadings in regular waves at the Stevens Institute test of the model of the preferred embodiment of the present invention.

FIG. 7 shows a band of power absorption efficiency at each wavelength. The different responses are obtained by varying the resistance to motion presented to the system by the power take-off device. In the case of the model tests this device is a magnetic clutch. By changing current in the clutch, resistance to that motion can be changed. With zero current the floats pivot freely on their hinges with the result that reflected energy is minimum and transmitted energy is maximum. With maximum clutch current, the system is rigid, in which case the reflected wave energy is at a maximum. In both cases absorbed energy is small. The optimum setting is an intermediate value between maximum and minimum.

The analytical results also show that absorption efficiency is related to the resistance to motion offered to the floats by the power transfer system as well as to float dimensions.

(2) Lake Pontchartrain Tests

The tests in Lake Pontchartrain were conducted in one test under normal wave patterns observed in wind generated waves. Other tests were run using wave generated by a boat running perpendicular to the axis of the array. This data is more difficult to analyze, but does show that, at worst, the performance is within the range of what might be expected from the model tests. The data from the larger scale tests is plotted in FIG. 7 by scaling the wave length proportionally to the ratio of beam widths.

In the Stevens tests the beam of the array was developed from the theoretical energy per foot of crest length for the chosen sea state with an assumed fifty percent total energy extraction efficiency, i.e. 50% of the available wave energy may be converted to power at the bus bar. As is discussed elsewhere, the results of the model test indicate a tendency for the array to absorb more power than is incident upon its beam.

Having theoretically and by test evaluation established a tentative technique for tuning the array to particular bandwidths within the spectrum and with a suitable sea state description available, a parametric study was performed to investigate the relationship between array geometry and power extraction. The results of the study are shown in FIGS. 3, 4, 5, and 6. It became apparent that for a constant power extraction level the ratio L/B (length of array divided by beam of array) is proportional to the wave length band. For example, if one decides on a 1 MW power extraction level and chooses to work in the high frequency end of the spectrum, i.e. shorter wave length, then L/B will be small and the array will be broad and short. Conversely, for 1 MW, if one chooses to work in the lower frequencies of the spectrum, i.e. long wave length, then L/B will be higher and the array will be long and narrow.

It also became apparent that there is a relationship between the number of pontoons in a given array length and the band width to which that length is tuned. For example, in an array of a given length L and rank of pontoon n, there is a tuned band width in the spectrum. If the array length L is held constant, or nearly so, but the number of pontoons increases to n', then it will be found that the tuned band width increases; and the increase in band width will be toward the higher frequency end of the spectrum. Although the greater band width increases the generating capacity of the array, a cost penalty is incurred as the number of hinges, hydraulic pistons, etc. increase. An economic balance must therefore be found between band width and number of pontoons.

One result of these studies was the development of two possible array geometries for purposes of cost analysis. The first is an array 625 feet by 164 feet theoretically capable of producing 3 MW and the second, an array 440 feet by 200 feet (see FIGS. 1 and 2) theoretically capable of producing 1 MW. The power figures are based upon a Pierson-Moskowitz wave energy spectrum and a wind speed of 30 knots (significant wave height of 16 feet). At this point further work on the large 3 MW unit was discontinued due to the difficulties encountered in the mooring system. Work to optimize the structural design was not continued since the concept, even in simplified form, showed significant cost advantages over other wave energy devices.

Industrial Applicability

Figure 1A:
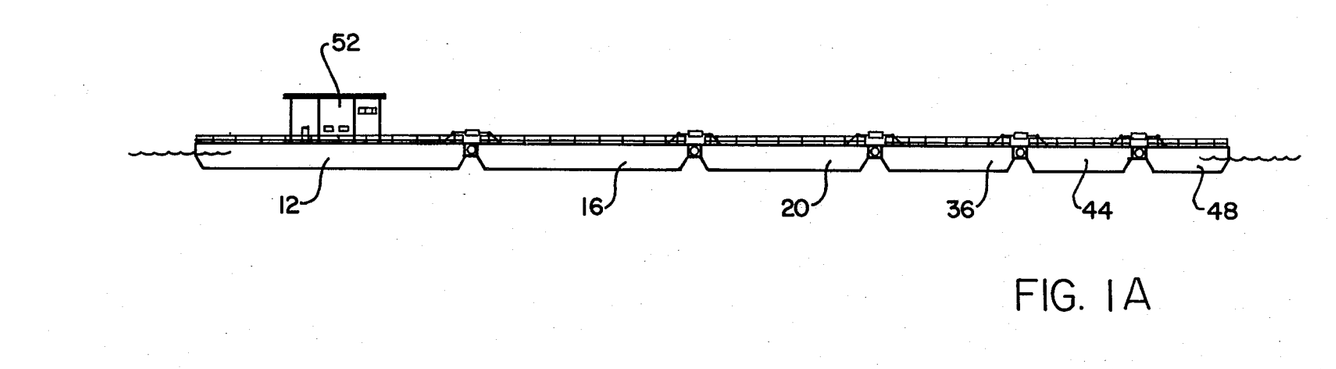

FIG. 1-A shows a plan view of a 1 MW generator module constructed according to the preferred embodiment of the present invention.

Wave generator 10 has a rear most float 12 connected by hinges 14 to a 90-foot float 16. Ninety-foot float 16 is connected at its end opposite float 12 by hinges 18 to 72-foot float 20. Seventy-two foot float 20 is connected at its left front side 22 by hinges 24 to 57-foot left-hand float 26. Float 26 is 30 feet wide and occupies the left most 30-foot portion of the front of float 22 opposite float 16. Thirty-foot wide float 26 is connected at its forward end by hinge 28 to 45-foot float 30. Float 30 is also 30 feet wide. Float 30 is connected at its forward most part 32 to 36-foot float 34.

Right-hand 57-foot long 30-foot wide float 36 is connected at its rear 38 by hinge 40 to the right-hand front most portion of float 20. Float 36 is connected by hinge 42 to 45-foot right-hand float 44, which is also 30 feet wide. Float 44 is connected at its front, by hinge 46 to front most 36-foot long right-hand float 48.

The arrangement of left-hand and right-hand floats attached to the front of float 20 leaves an open space 50 that is 138 feet by 40 feet between the right- and left-hand arrays connected to the front of float 20.

A generator building 52 on rear most float 12 provides space for the power generators and living quarters for the crew of the generator module. The top of building 52 is a heliport for convenient access to the generator module.

Figure 1B:
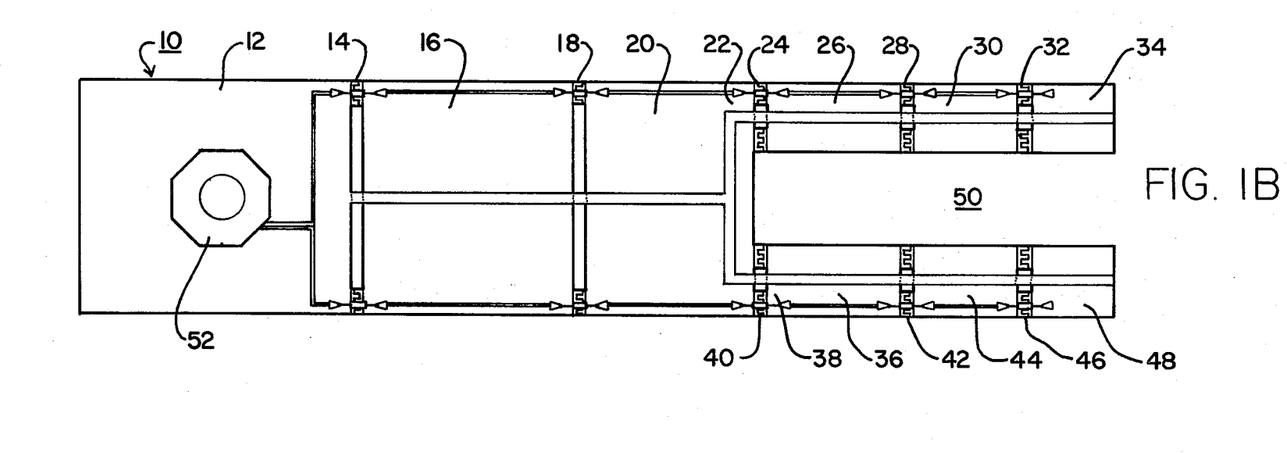

As is shown in FIG. 1-B the floats of module 10 are approximately 10 feet deep and float half submerged in the water.

One megawatt generator module 10 is 440 feet by 100 feet and is tuned to wavelengths of 168 feet (w=1.1) to 412 feet (w=0.7). The unit is made up of nine pontoons ranging in length from 36 feet up to 115 feet, as shown by the dimensions indicated in FIG. 1. There are five hinge lines and a total of 16 individual hinges. The steel weight of the entire unit is approximately 1200 long tons.

In a commercial system, the module shown in FIG. 1-A would most likely be made of concrete. The use of concrete would lend itself both to production line techniques and be required in a large-scale building program to assure a relatively long maintenance-free life.

If the module is made of steel, corrosion should be inhibited by protective coatings and cathodic protection systems.

Not shown in FIG. 1-A, but implied by the fact that it is a generator module, are the hydraulic cylinders located at each hinge point to pump a hydraulic fluid or sea water or water/oil mixture to an impulse type "Pelton" Wheel hydraulic turbine which in turn will drive an electric generator.

A sea water hydraulic system would offer many advantages, but also has certain disadvantages, which may increase unit cost.

Advantages of sea water system:
 (a) No return piping required;
 (b) no concern over static head for return system;
 (c) no pollution in the event of a line rupture;
 (d) no concern over foaming in a return system.

Disadvantages of sea water system:
 (a) Hydraulic cylinder materials become non-standard with resultant cost increase;
 (b) Pelton Wheel erosion is a possible problem;
 (c) lack of lubricity will increase hydraulic cylinder wear;

(d) piping and valve materials increase in cost.

Pressures of the Pelton Wheel nozzle must be selected to produce the proper "specific speed" of the wheel. Accumulators will be provided to even out flow rates.

Applicant has developed a preliminary cost estimate for this 1 MW generator module. These are included in this specification for the sake of completeness and to indicate the cost of the best mode of practicing the present invention known to the inventor.

The criteria used in these cost estimates are:
(1) All costs are fiscal year 1978;
(2) all costs are based on a single demonstration unit.

Estimated Cost Summary
(Costs in thousands of dollars)

| Item | 1 MW | 3 MW |
|---|---|---|
| Floats (steel construction) | $1,230 | $3,140 |
| Hinges | 456 | 1,140 |
| Mooring System - single point type | 500 | 1,000 |
| Hydraulic turbing, generator and switchboard | 150 | 220 |
| Hydraulic Cylinders | 160 | 350 |
| Piping Systems and Installation | 200 | 250 |
| Quarters, Life Saving Equipment, etc. | 100 | 100 |
| Total | $2,796 | $6,300 |

The above cost estimates result in a construction cost per installed kilowatt of $2,796/KW for a 1 MW unit and $2,100/KW for the 3 MW unit. It should be pointed out that the above costs will increase should a multiple point mooring system be incorporated. Rough estimates for the increase in cost due to the substitution of a multiple point mooring system would be about $1.25 million for the 1 MW unit and about $2.20 million for the 3 MW unit.

Should concrete floats be substituted for the steel floats, the increase in cost would be approximately $713,000 for the 1 MW unit and about $1.4 million for the 3 MW unit. Concrete construction costs are based upon a mean construction cost of $54 per square foot of float deck area which was obtained from Marine Concrete Structures, Inc.

The above costs do not include further research and development costs nor final design engineering costs.

Functionally, in FIG. 1-A the outward projecting left-hand arm comprising floats 26, 30 and 34 and the outward projecting right-hand arm comprising floats 36, 44 and 48 of generator module 10 effectively intersect all of the wave energy falling across the entire 100 foot beam of generator module 10. Since it is not necessary to build a steel or concrete structure to fill space 50, cost of construction is reduced.

Figure 2:
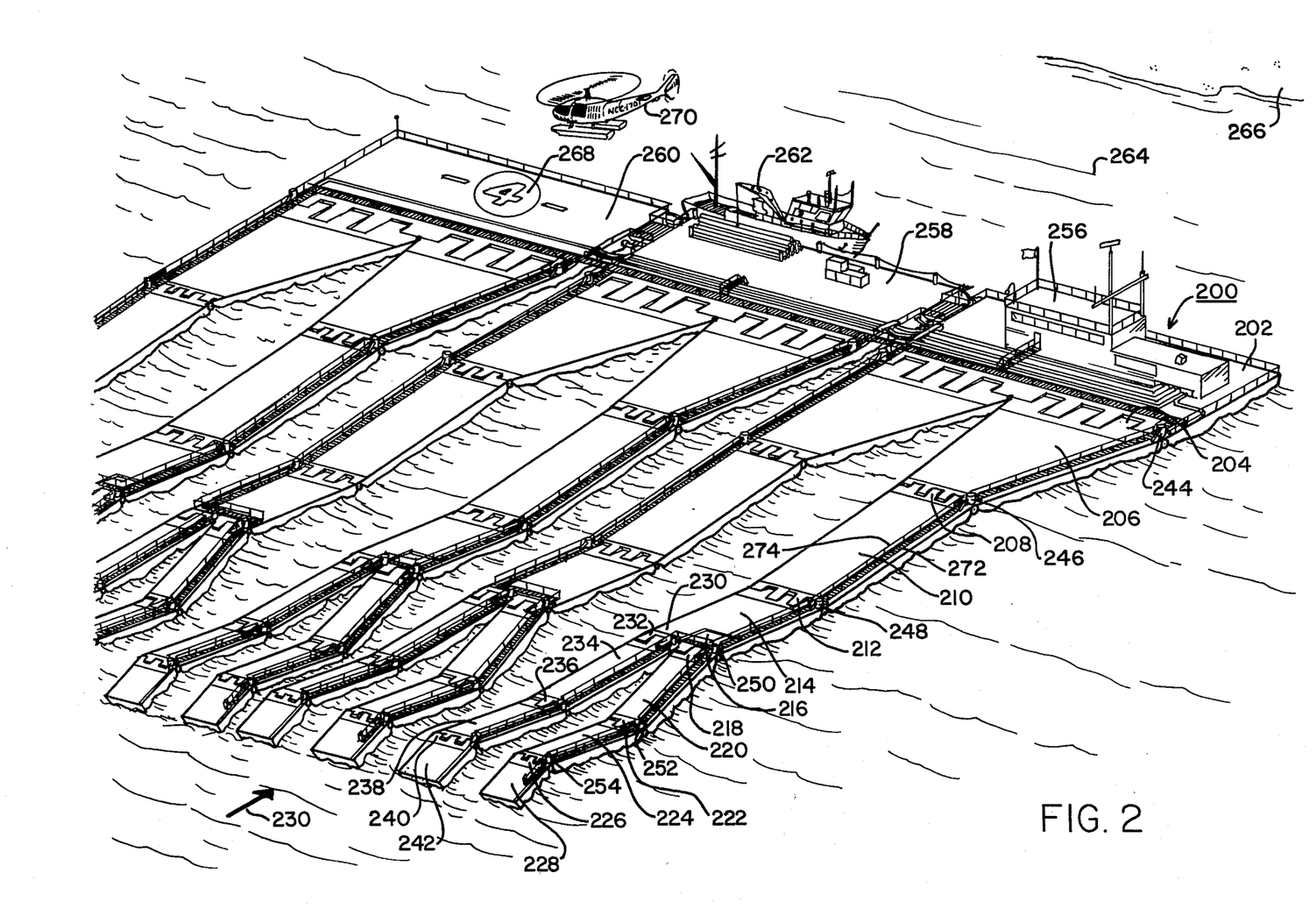
FIG. 2 is an aerial perspective view showing a plurality of one megawatt wave generating modules arrayed according to the preferred embodiment of the present invention.

FIG. 2 shows an oblique overhead view of three power modules constructed according to the preferred embodiment of the present invention.

In FIG. 2 first Hagen Array 200 comprises a rear float 202 coupled by a right-hand hinge 204 to right-hand first float member 206. Right-hand first float member 206 is connected by hinge 208 to second float member 210. Second float member 210 is connected at its forward end by hinge 212 to third float member 214. Third float member 214 is connected at its forward right-hand edge 216 by right-hand front hinge 218 to float 220. Float 220 is connected at its front end by hinge 222 to float 224. Float 224 is connected by hinge 226 to front right-hand float 228. The left-hand front portion 230 of float 214 is connected by hinge 232 to left-hand float 234. Left-hand float 234 is connected by hinge 236 to float 238. Float 238 is connected by hinge 240 to front left-hand float 242.

First hydraulic power extraction means 244 operably connects float 206 to rear-most float assembly 202. Similar hydraulic work extracting means 246, 248, 250, 252, and 254 are operably connected between the articulated float members of Hagen Array 200.

Rear-most float 202 of Hagen Array 200 is shown with a generating and maintenance facility building 256 mounted upon it. The articulated Hagen Array described by elements number 204 through 254, above, is one of six identical Hagen Arrays shown in FIG. 2. Two of these array structures are connected by hinges to rear support floats 202, 258 and 260 in FIG. 2.

A ship 262 is shown docked to a berthing facility which forms an integral part of rear-most float 258.

The entire structure shown in FIG. 2 floats on the surface of the ocean 264 some distance out from land 266.

The entire Hagen Array is oriented so it points into the incident waves, which are indicated by arrow 230. Rear-most left-hand float 260 is equipped with a helipad 268 which helicopter 270 is approaching for a landing.

All of the Hagen Array shown in FIG. 2 are shown with safety inspection catwalks 272 and handrails 274.

It should be noted that each element of the Hagen Arrays shown in FIG. 2 is tuned to a specific wavelength of the incident waves 230 striking the array. Similarly, as per the preferred embodiment of the present invention, each of the Hagen Array elements is separated by approximately one-half the wavelength of the incident waves which they are tuned to absorb. As is shown in FIG. 2, this means that the small front array element such as 228 and 242 are spaced apart by a relatively short distance, this distance being one-half the wavelength of the incident waves to which they are tuned. Similarly, the larger Hagen Array elements such as elements 214 and 210 are separated from their counterparts by a larger distance, said larger distance being approximately equal to one-half the wavelength of the incident waves these larger array elements are tuned to absorb.

As is shown in connection with FIGS. 3 through 6, below, generator modules may be sized such that they may swing through a wide arc around their mooring points without mutual interference.

Although the present invention has been shown using a Hagen wave raft taught by U.S. Pat. No. 4,077,213, it is possible to space Salter Ducks or Cockrell wave rafts one-half wavelength part to effectively intersect a portion of the wave energy between them. Applicant has discussed his invention in connection with his earlier patented wave raft because he believes, on the basis of laboratory and field tests, that the Hagen Array, being a broadband device, is far more efficient at collecting wave energy from a broad power spectrum of waves than these other devices.

Figure 3:
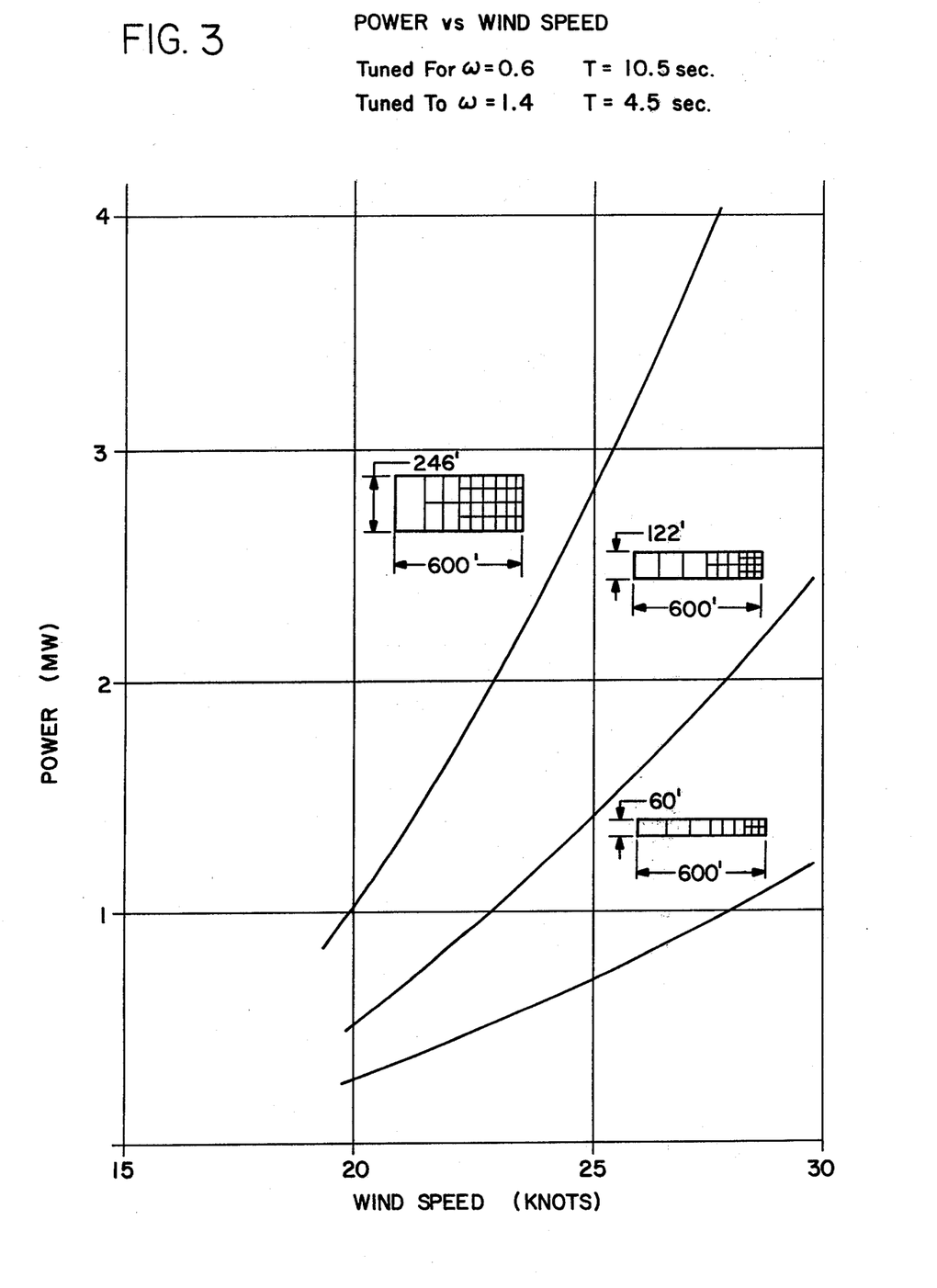
FIG. 3 is a graph, with schematic drawings of three 600-foot generating modules constructed according to the preferred embodiment of the present invention, plotting power absorbed by those modules versus wind speed assuming a Pierson-Moskowitz Wave Energy Spectrum.
Figure 4:
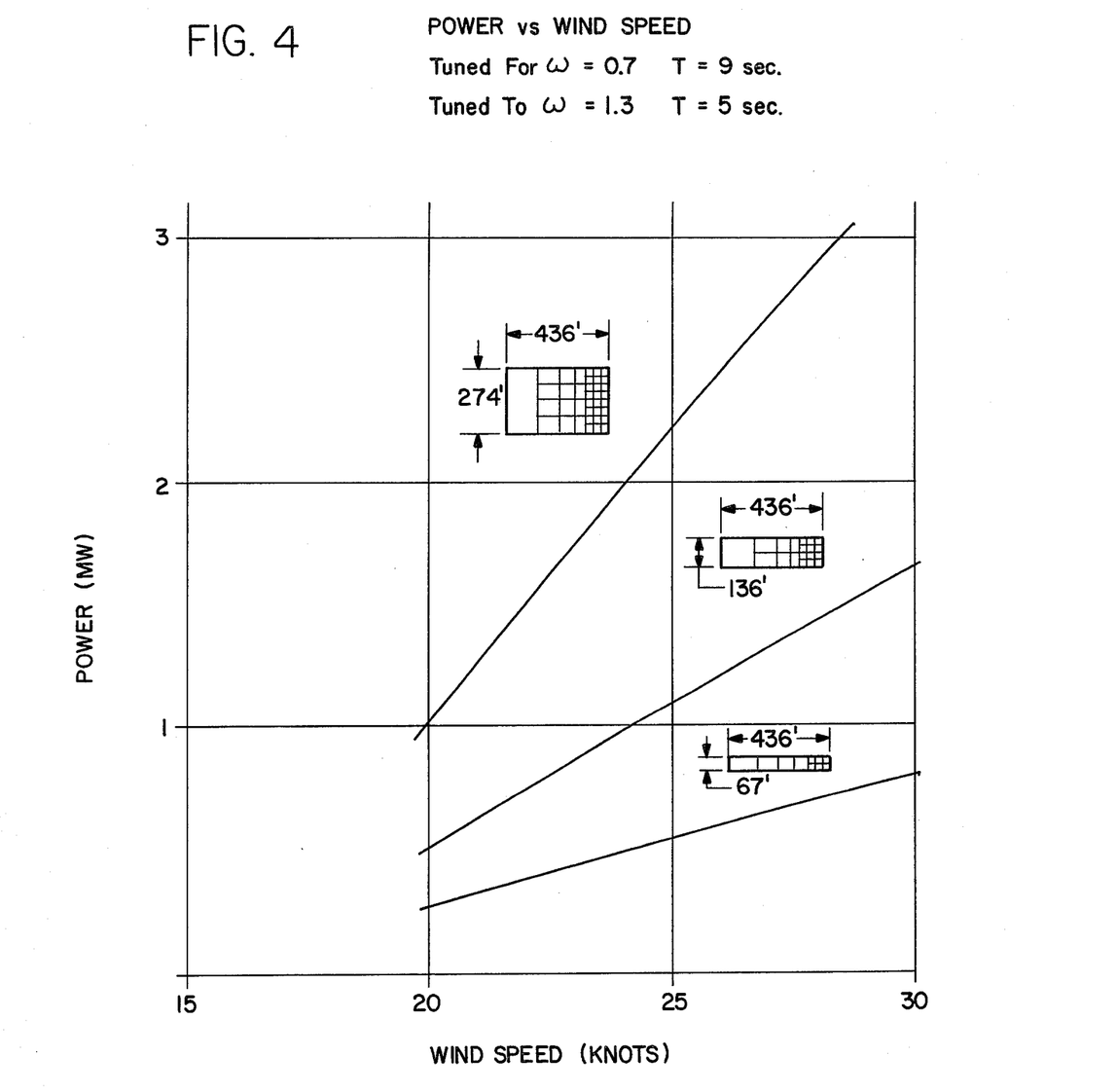
FIG. 4 is a graph, with schematic representations of 436-foot power generating modules constructed according to the preferred embodiment of the present invention, plotting power versus wind speed assuming a Pierson-Moskowitz Wave Energy Spectrum.
Figure 5:
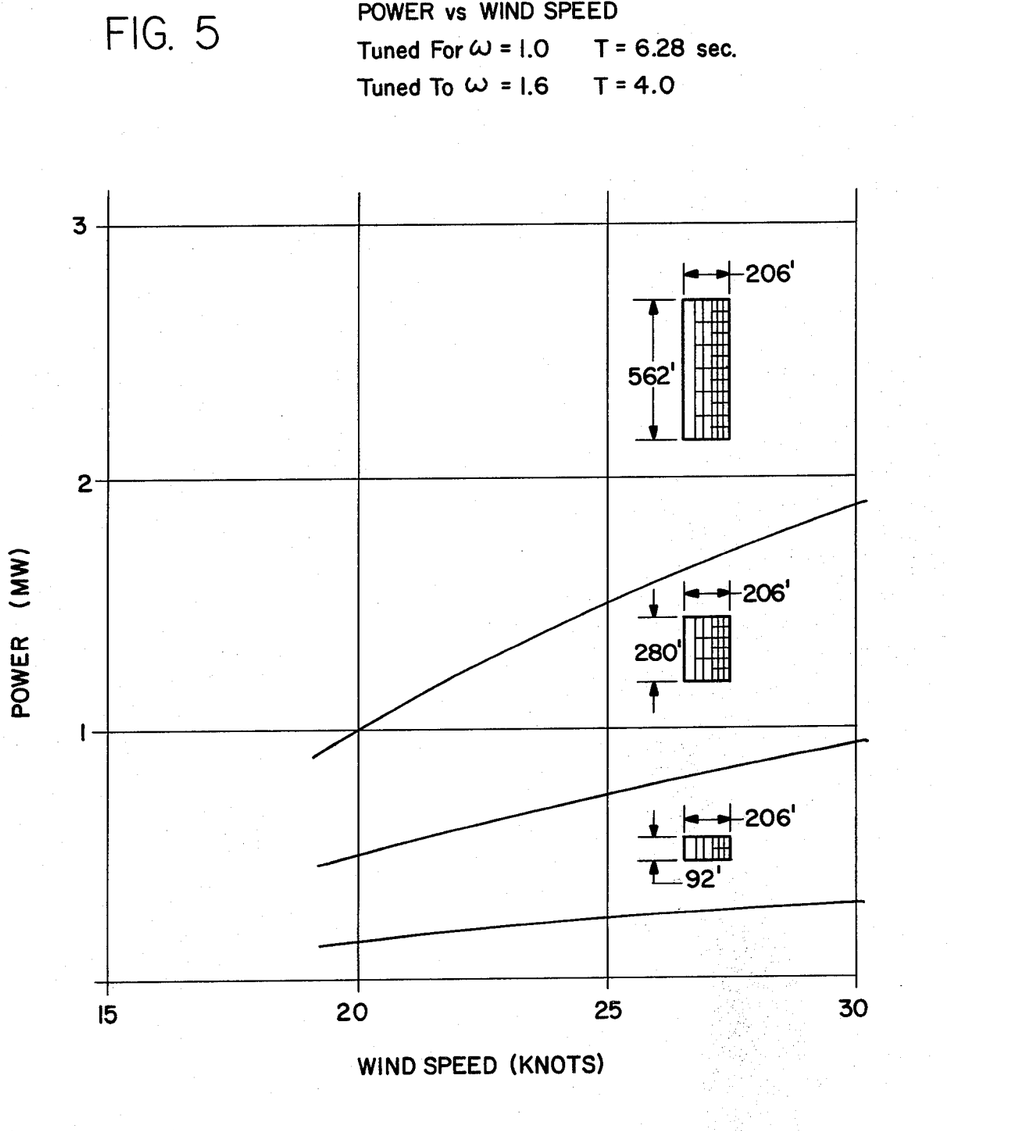
FIG. 5 is a graph, with schematic representations of 206-foot power modules constructed according to the preferred embodiment of the present invention, plotting power versus wind speed assuming a Pierson-Moskowitz Wave Energy Spectrum.

FIGS. 3, 4 and 5 are graphs that show 600-foot, 436-foot, and 206-foot embodiments of the generator modules used by the preferred embodiment of the present invention. The graph is of the power extracted by one of these units from the wave spectra generated by the Pierson-Moskowitz wave spectrum theorum for a given wind speed. The Y axis of the graph is the power in megawatts absorbed by each module and the X axis of each graph is the wind speed in knots giving rise to the Pierson-Moskowitz wave spectrum acting on the modules. Each module's schematic representation, with dimensions, is shown above and to the left of the power curve generated by that module. The legend at the top of each graph shows the wavelength and repetition rate to which the wave rafts in that raft are tuned. To operate these generator modules according to the preferred embodiment of the present invention, they are be formed into an array with each module separated by approximately half the wavelength of the waves incident upon the module. If the incident wavelengths impinging on the array were seasonably variable, then the space in between the modules could be adjusted to optimize the power extracted from the incident waves at a given time.

Figure 6:
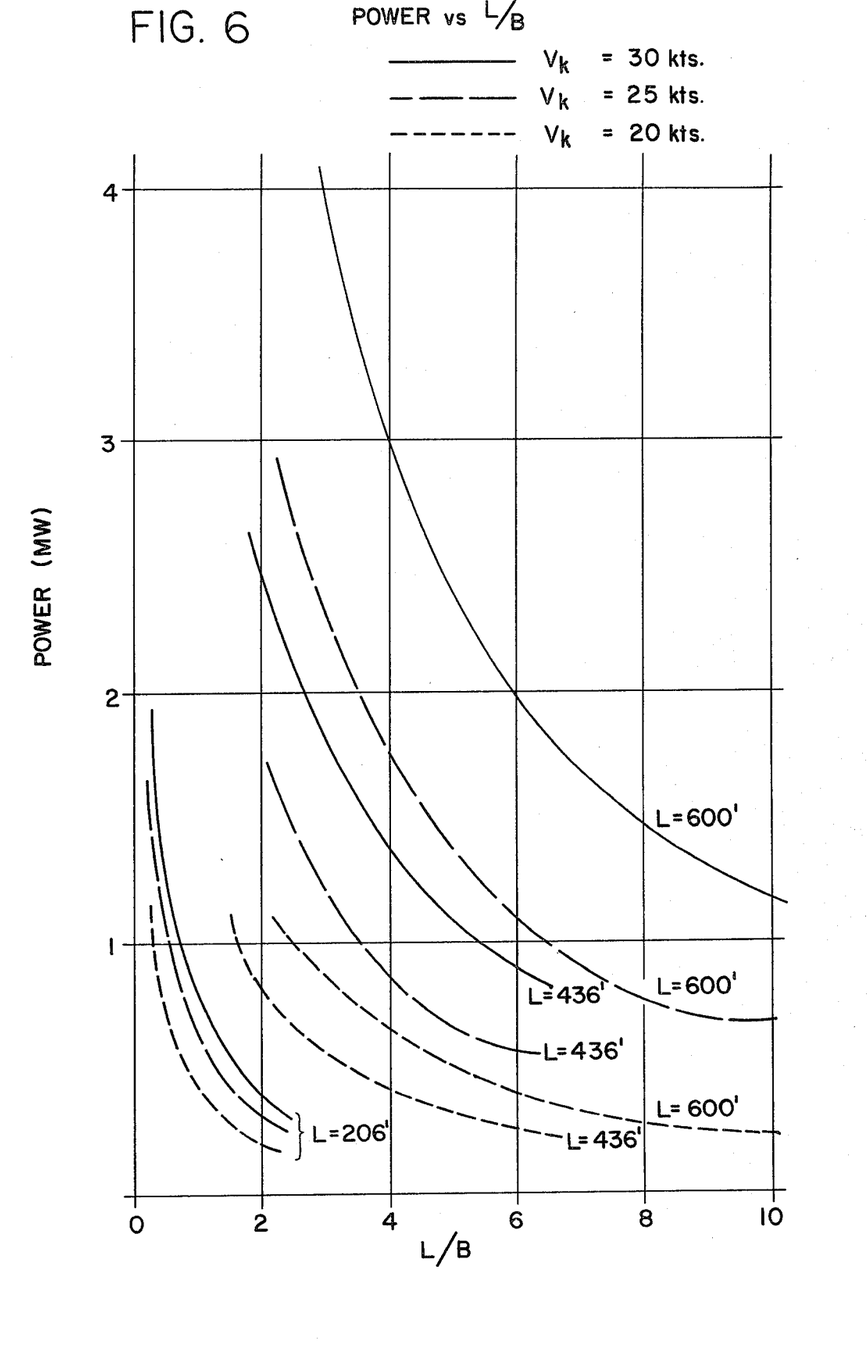
FIG. 6 is a graph plotting absorbed power in megawatts against the length to beam ratio of the wave generating power modules constructed according to the preferred embodiment of the present invention for 30-, 25-, and 20-knot winds.

FIG. 6 summarizes the information shown in FIGS. 3, 4 and 5. FIG. 6 is a plot of power extracted by a single module versus the absorption rate divided by beam width of the sea states predicted by the Pierson-Moskowitz wave spectrum for three different wind speeds.

FIG. 7 shows a band of power absorption efficiency at each wavelength. The different responses are obtained by varying the resistance to motion presented to the Stevens Institute test system by its power takeoff devices, a magnetic clutch. By changing currents in the clutch, resistance to motion can be changed. With zero current the floats pivot freely on the hinge with the result that reflected energy is minimum, transmitted energy is maximum. At maximum clutch current the system is rigid in which case the reflected wave is at a maximum.

FIG. 8 is the Pierson-Moskowitz energy spectrum shown for 30 knot, 25 knot, 20 knot and 15 knot winds. This graph also shows the plan by which the dimensions for FIGS. 1-A and 1-B, the 1 MW test module was obtained.

The present invention, i.e. spacing apart the array elements to absorb the maximum amount of wave energy for a minimum cost structure, has been illustrated by a number of specific examples and more generally illustrated theoretically. The purpose of these specific embodiments is to inform those skilled in the art of making and using wave generator arrays how they may best use the present invention. The specific embodiments described herein should not be deemed as the only way the invention can be used.

The invention, therefore, should be limited only by the following claims and their equivalents.

I claim:

1. An apparatus floating in a fluid that exhibits wave motion, comprising:
   a plurality of adjoining Hagen arrays;
   each of said Hagen arrays consisting of a plurality of floating elements, each of said elements being sized to be maximally responsive to a different wave length of said wave motion;
   each element of said array being separated from the same sized element of an adjoining array by approximately one-half the specific wave length to which said elements are sized to be maximally responsive.

2. The apparatus as in claim 1 further including means responsive to the wave-length of the waves incident on said arrays for adjusting the distance between said arrays.

* * * * *